April 21, 1925.
R. J. ALTGELT
1,534,675
RIDING CULTIVATOR
Filed May 13, 1922
2 Sheets-Sheet 1
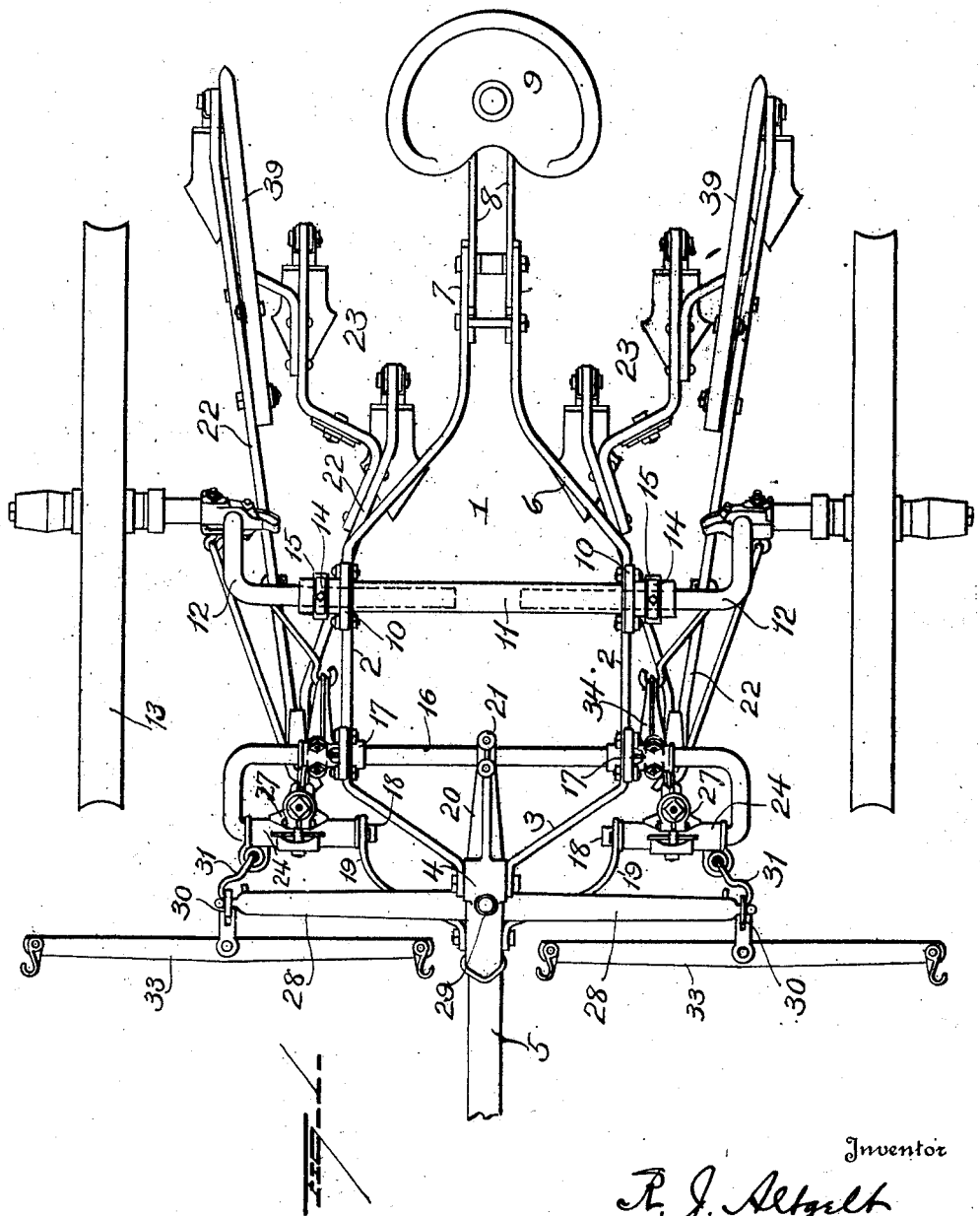

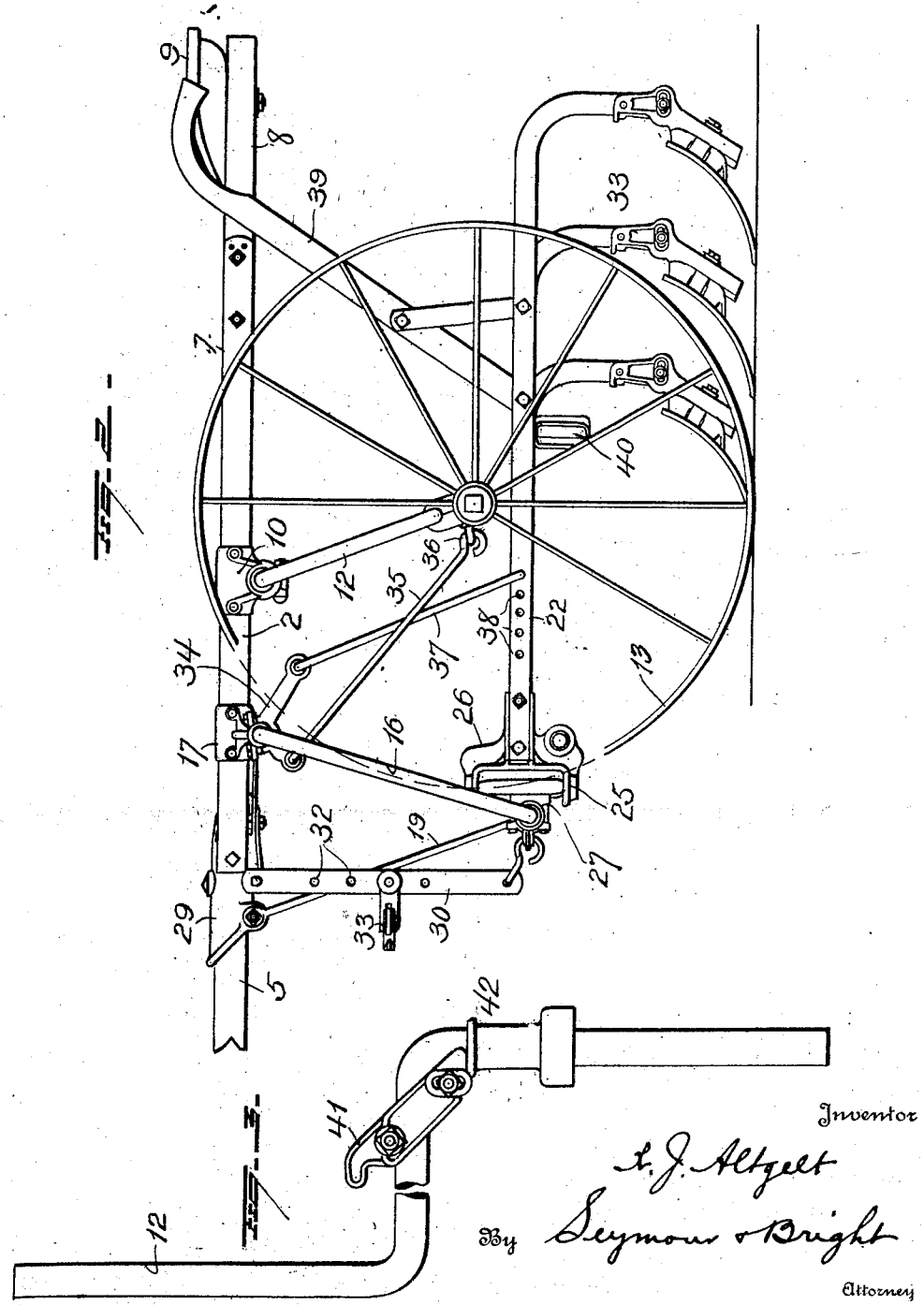

Patented Apr. 21, 1925.

1,534,675

UNITED STATES PATENT OFFICE.

RUDOLPH J. ALTGELT, OF SOUTH BEND, INDIANA, ASSIGNOR TO OLIVER CHILLED PLOW WORKS, OF SOUTH BEND, INDIANA.

RIDING CULTIVATOR.

Application filed May 13, 1922. Serial No. 560,702.

*To all whom it may concern:*

Be it known that I, RUDOLPH J. ALTGELT, a citizen of the United States, and a resident of South Bend, in the county of Saint Joseph and State of Indiana, have invented certain new and useful Improvements in Riding Cultivators; and I do hereby declare the following to be a full, clear, and exact description of the invention, such as will enable others skilled in the art to which it appertains to make and use the same.

This invention relates to improvements in riding cultivators,—one object of the invention being to provide in a simple structure, a cultivator in which the weight of the gangs, as well as that of the remainder of the cultivator and the operator who rides thereon, shall be balanced, and which shall employ no operating levers.

A further object is to so construct a cultivator of the character specified, that the same may be readily adjusted in accordance with the weight of the operator and in such manner that the penetration of the earth engaging elements may be regulated for hard or for soft ground.

A further object is to so construct the cultivator that weight will be applied to the pole when the gangs are raised and prevent the pole from flying up and so that such weight will not be applied to the pole when the shovel gangs are in the ground.

With these and other objects in view the invention consists in certain novel features of construction and combinations of parts as hereinafter set forth and pointed out in the claims.

In the accompanying drawings; Figure 1 is a plan view of a cultivator illustrating an embodiment of my invention; Figure 2 is a side elevation of the same and Figure 3 is a detail view.

The frame 1 of the cultivator comprises bars having parallel intermediate portions 2, 2 suitably spaced apart; converging forward portions 3, 3 secured at their forward ends to a pole socket casting 4 in which the rear end of a pole 5 is rigidly clamped, and rear converging portions 6 terminating in parallel portions 7. Bars 8 are secured to the frame portions 7 and form, in effect, rearward extensions of the same for supporting an operator's seat 9.

Brackets 10 are secured to the parallel portions 2 of the frame bars and to these brackets, a tubular transverse bar 11 is clamped. The tubular bar 11 provides bearings for the horizontal portions of crank axle member 12 and the spindles of the latter enter the hubs of carrying wheels 13. To prevent longitudinal displacement of the axle sections, collars 14 may be secured to the latter and adapted to turn with said axle sections, in recesses in the brackets 10 as indicated at 15.

A front arch 16 is connected with the frame 1 through the medium of brackets 17 secured to the forward portions of the portions 2 of the frame bars. The side members of the arch project downwardly from the frame and somewhat forwardly and are provided at their lower ends with inwardly projecting horizontal arms 18. The front arch 16 is held rigidly in position by means of brace rods 19, each secured at one end to one of the yoke arms 18 and at the other end to the pole socket-casting 4, and the latter is made with an arm or extension 20 connected, as indicated at 21 with said front arch.

The frames 22 of shovel or cultivator gangs 23 are connected with the horizontal yoke arms 18 through the medium of coupling devices which are so constructed as to permit both vertical and lateral swinging movement of the gangs. These coupling devices may comprise sleeves 24 mounted loosely on the horizontal yoke arms 18; vertical spindles 25 mounted in brackets 26 secured to the forward ends of the gang frames, and clamping devices 27 connecting the vertical spindles 25 with the horizontal sleeves 24.

A horizontal cross bar 28 may be pivotally connected centrally between its ends, as at 29, with the pole casting 4 and with the respective ends of said horizontal bar, the upper ends of vertical draft bars 30 may be connected, the lower ends of said draft bars being loosely connected, through the medium of links 31, with the sleeves 24 and provided between their ends with holes 32 to permit single-trees 33 to be adjustably connected therewith.

A bell crank 34 is mounted upon the upper horizontal member of the front arch 16 approximately over the forward end of each gang frame. The shorter arms of the bell cranks are connected, by means of rods or links 35 with the cranks of the axles through the medium of eye-bolts 36 connected with said axles. Rods or links 37 are connected at their upper ends with the longer arms of the bell cranks and the lower end of each of these rods is connected adjustably with one of the cultivator gang frames, a beam of each of the latter being provided with a plurality of holes 38 to facilitate such adjustable connection.

A handle 39 is secured to each gang frame, and each gang frame is provided with a stirrup or foot rest 40.

Hang-up hooks for the gangs are provided on the axle members, and may be made rigid with (preferably parts of) the sand band castings 42.

With the construction and arrangement hereinbefore described, the weight of the gangs will be balanced as will also the weight of the frame and that of the operator on the seat. Weight will be put upon the pole when the gangs are raised and will be off the pole when the shovel gangs are in the ground. In other words, when the cultivator gangs are raised, there will be neck weight to keep the pole from flying up, and when the gangs are down, there will be no neck weight.

The operation of my improved cultivator may be described as follows:—

It may be assumed that an operator is upon the seat 9; that the gangs are supported in raised position on the hooks 41; that the wheels have been moved back and that there is sufficient neck weight to keep the front end of the pole from flying up. The operator will now lift the gangs off the hooks 41, with the use of the handle 39 and allows the gangs to move down to the ground. The effect of the downward movement of the gangs will be to cause the rods or links 37 to pull down on one arm of each bell crank 34 and the other arm of each bell crank will move forwardly and pull the wheels forwardly, through the medium of the rods or links 35 connected with the crank axle members. While the gangs are moving downwardly, the frame and the operator on the seat will be raised a few inches higher from the ground. On the other hand when the gangs are being raised, the frame and operator on the seat will be lowered, which will cause the balancing of the weight of the gangs, so that it requires about the same slight effort to raise as to lower the gangs.

For a heavy operator on the seat, the rod or link 37 for each gang frame would be adjusted to one of the forward holes 38 in order to balance the weight of the gangs, and for a light operator, the said rods or links 37 would be connected with rear holes 38 in the gang frames. The gangs may be adjusted to operate in hard ground by moving the connections of the rods 37 with the gang frames forwardly and for working in soft ground these connections should be adjusted rearwardly.

It will be observed that with my improvements no operating levers are required, and that either gang may be raised or lowered independently of the other or both gangs may be raised or lowered simultaneously, and that either or both gangs may be shifted laterally, all with the expenditure of a minimum amount of effort on the part of the operator.

My improved cultivator is exceedingly simple in construction, comprising comparatively few parts; is easy to control, and efficient in operation.

I do not in this application claim the hang-up hooks for the gang frames, secured to the crank axle members, the same being covered in divisional application filed by me on the 19th day of December, 1924, and designated by Serial No. 756,980.

Various slight changes might be made in the details of my invention without departing from the spirit thereof or limiting its scope and hence I do not wish to restrict myself to the precise details herein set forth.

Having fully described my invention what I claim as new and desire to secure by Letters-Patent, is:—

1. In a cultivator, the combination with crank axle members and wheels, a main frame mounted intermediate of its ends upon said axle and carrying a seat near its rear end, a front arch, and cultivator gang frames connected at their forward ends with depending portions of the front arch, of a pole connection secured to the forward portion of the frame and connected with the upper horizontal portion of said arch, braces extending from the lower portions of said arch to said pole connection, bell-cranks mounted on the front arch, a connection between one arm of each bell-crank and one of the crank axle members, and rods connected at one end with the other arms of said bell-cranks, said rods having adjustable connection with the gang frames.

2. In a cultivator, the combination of a main frame provided near one end with a seat, crank axle members loosely connected with an intermediate portion of said main frame, carrying wheels, a front arch connected with the main frame, means for connecting said main frame and front arch rigidly with a pole, gang frames, coupling devices connecting said gang frames with the front arch, bell-cranks mounted on said front arch, a connection between one arm of each bell crank and one of the gang frames, and a connection between the other arm of each bell-crank and the cranked portion of one of the axle members.

3. In a cultivator, the combination of a main frame provided near one end with a seat, a pole connection secured to the forward end of said frame, crank axle members loosely connected with an intermediate portion of said frame, carrying wheels, a front arch secured to the main frame and provided at the lower ends of its side members with inwardly projecting arms, braces connecting said arms with said pole connection, gang frames, coupling devices between said gang frames and the inwardly projecting arms of the front arch, bell-cranks mounted on said arch, a connection between one arm of each bell-crank and the cranked portion of one crank axle member, and a connection between the other arm of each bell crank and one of the gang frames.

4. In a cultivator, the combination of a main frame, a tubular cross bar secured thereto intermediate of its ends, crank-axle members mounted in said tubular cross bar, carrying wheels, a seat on the rear portion of said frame, a front arch secured to said frame, a pole casting rigidly secured to the main frame and to said arch, gang frames connected with said front arch, bell-cranks mounted on the front arch, connections between one arm of each bell-crank and the cranked portion of one of the axles, connections between the other arm of each bell crank and one of the gang frames, and handles and foot rests connected with the gang frames.

In testimony whereof, I have signed this specification in the presence of two subscribing witnesses.

RUDOLPH J. ALTGELT.

Witnesses:
  JENNIE M. DAVIS,
  GEORGE R. LANPHERE.